United States Patent
Peeler et al.

(10) Patent No.: US 9,667,797 B2
(45) Date of Patent: May 30, 2017

(54) SYSTEMS AND METHODS FOR FUSION OF AUDIO COMPONENTS IN A TELECONFERENCE SETTING

(71) Applicant: Dell Products L.P., Round Rock, TX (US)

(72) Inventors: Douglas Jarrett Peeler, Austin, TX (US); Deeder M. Aurongzeb, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 201 days.

(21) Appl. No.: 14/253,100

(22) Filed: Apr. 15, 2014

(65) Prior Publication Data
US 2015/0296085 A1 Oct. 15, 2015

(51) Int. Cl.
H04B 3/00 (2006.01)
H04M 3/56 (2006.01)
H04R 27/00 (2006.01)

(52) U.S. Cl.
CPC ............ *H04M 3/568* (2013.01); *H04R 27/00* (2013.01); *H04M 2203/509* (2013.01)

(58) Field of Classification Search
CPC ... H04R 27/00; H04R 2217/03; H04M 3/568; H04M 2203/509
See application file for complete search history.

(56) References Cited

U.S. PATENT DOCUMENTS

| | | | | |
|---|---|---|---|---|
| 6,792,263 B1 * | 9/2004 | Kite | ...................... | H04M 1/652 455/412.1 |
| 7,502,481 B2 * | 3/2009 | Abrams | ................... | H04K 1/00 381/111 |
| 7,526,093 B2 * | 4/2009 | Devantier | ................ | H04R 5/02 381/300 |
| 7,613,314 B2 * | 11/2009 | Camp, Jr. | .............. | H04R 25/70 381/312 |
| 7,835,529 B2 * | 11/2010 | Hernandez | ........... | G10K 11/178 381/71.11 |
| 8,050,715 B1 * | 11/2011 | Cole | ...................... | H04B 1/034 455/550.1 |
| 8,379,873 B2 * | 2/2013 | Yamkovoy | ............. | H04R 29/00 381/309 |
| 8,463,414 B2 * | 6/2013 | Francois | ............... | G10L 19/008 700/94 |
| 8,559,655 B2 * | 10/2013 | Mihelich | ................. | H04S 7/301 381/103 |

(Continued)

*Primary Examiner* — Simon Sing
(74) *Attorney, Agent, or Firm* — Jackson Walker L.L.P.

(57) ABSTRACT

In accordance with embodiments of the present disclosure, a method may include determining capability of each particular information handling system of a plurality of information handling systems to support combination of functionality of audio components of the particular information handling system. The method may also include determining audio performance parameters of the audio components of the information handling systems of the plurality of information handling systems which are capable of supporting combination of functionality of audio components. The method may further include, based on the audio performance parameters, combining functionality of audio components of the plurality of information handling systems which are capable of supporting combination of functionality of audio components.

21 Claims, 3 Drawing Sheets

(56) References Cited

U.S. PATENT DOCUMENTS

| | | | |
|---|---|---|---|
| 9,084,048 B1* | 7/2015 | Gottlieb | H04R 3/04 |
| 2003/0185404 A1* | 10/2003 | Milsap | H04R 3/12 |
| | | | 381/77 |

* cited by examiner

SYSTEMS AND METHODS FOR FUSION OF AUDIO COMPONENTS IN A TELECONFERENCE SETTING

TECHNICAL FIELD

The present disclosure relates in general to information handling systems, and more particularly, to fusing audio components (e.g., loudspeakers and microphones) together to maximize audio experience of conference participants in a teleconference setting.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Various types of information handling systems may be utilized to conduct teleconferences among a plurality of participants. A key goal of teleconference systems is capture of high-quality speech without constraining a speaker to be tethered to a particular device to require a user to be very close to a microphone. Due to space requirements and system limitations, it is impractical to provide for high audio performance within a single information handling system (e.g., tablet, notebook, etc.). Effective beam forming and sound level control from a single computing device is very difficult due to varying size of rooms, number of participants, and location of participants. As a result, traditional teleconferencing approaches often experience echo, reverberation, variations in volume levels, muted higher frequencies, and other undesirable audio qualities, leading to negative user experience.

SUMMARY

In accordance with the teachings of the present disclosure, one or more disadvantages and problems associated with providing a desirable user experience in a teleconference setting may be reduced or eliminated.

In accordance with embodiments of the present disclosure, a method may include determining capability of each particular information handling system of a plurality of information handling systems to support combination of functionality of audio components of the particular information handling system. The method may also include determining audio performance parameters of the audio components of the information handling systems of the plurality of information handling systems which are capable of supporting combination of functionality of audio components. The method may further include, based on the audio performance parameters, combining functionality of audio components of the plurality of information handling systems which are capable of supporting combination of functionality of audio components.

In accordance with these and other embodiments of the present disclosure, an information handling system may include a processor and a non-transitory computer readable medium coupled to the processor. The computer-readable medium may have stored thereon a teleconference application, the teleconference application configured to, when executed, determine capability of each particular information handling system of a plurality of information handling systems including the information handling system to support combination of functionality of audio components of the particular information handling system, determine audio performance parameters of the audio components of the information handling systems of the plurality of information handling systems which are capable of supporting combination of functionality of audio components, and, based on the audio performance parameters, combine functionality of audio components of the plurality of information handling systems which are capable of supporting combination of functionality of audio components.

In accordance with these and other embodiments of the present disclosure, an article of manufacture may include a non-transitory computer readable medium and computer-executable instructions carried on the non-transitory computer readable medium. The instructions may be readable by a processor, and, when read and executed, for causing the processor to determine capability of each particular information handling system of a plurality of information handling systems including the information handling system to support combination of functionality of audio components of the particular information handling system, determine audio performance parameters of the audio components of the information handling systems of the plurality of information handling systems which are capable of supporting combination of functionality of audio components, and, based on the audio performance parameters, combine functionality of audio components of the plurality of information handling systems which are capable of supporting combination of functionality of audio components.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
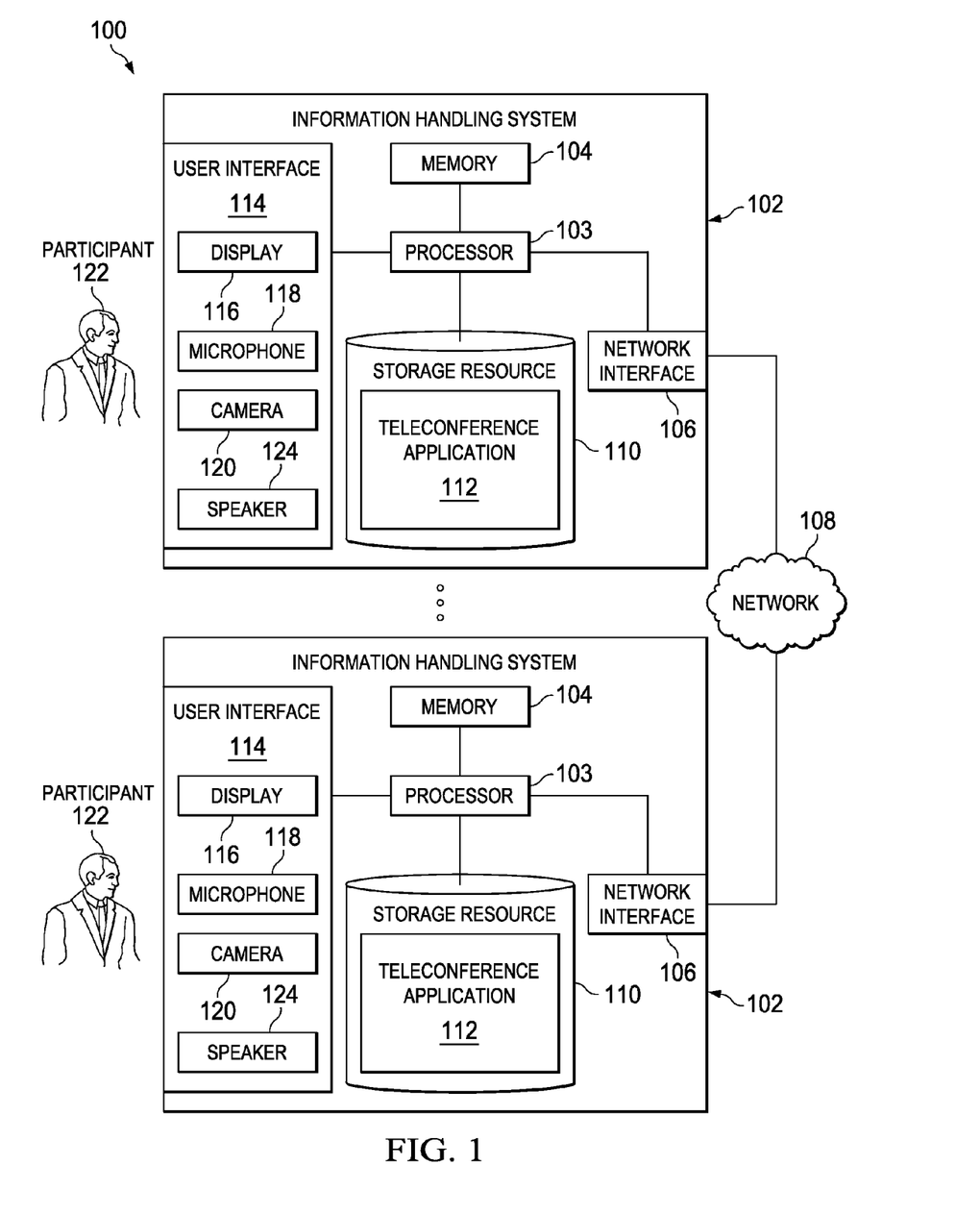
FIG. 1 illustrates a block diagram of an example teleconferencing system, in accordance with embodiments of the present disclosure.
Figure 2:
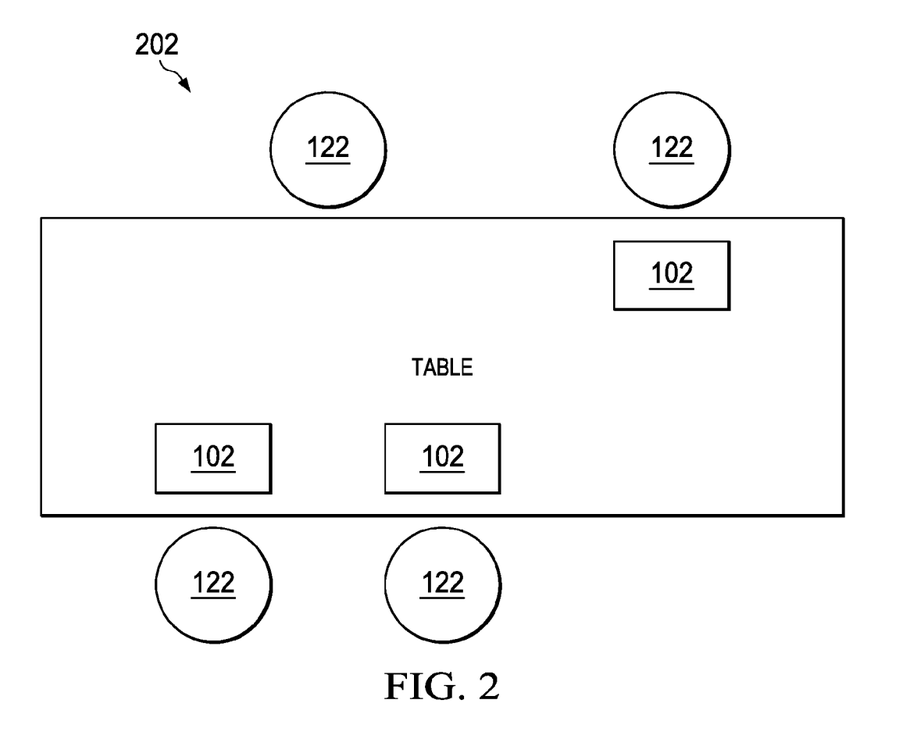
FIG. 2 illustrates a plan view of an example conference room setting depicting example locations of participants and information handling systems, in accordance with embodiments of the present disclosure.
Figure 3:
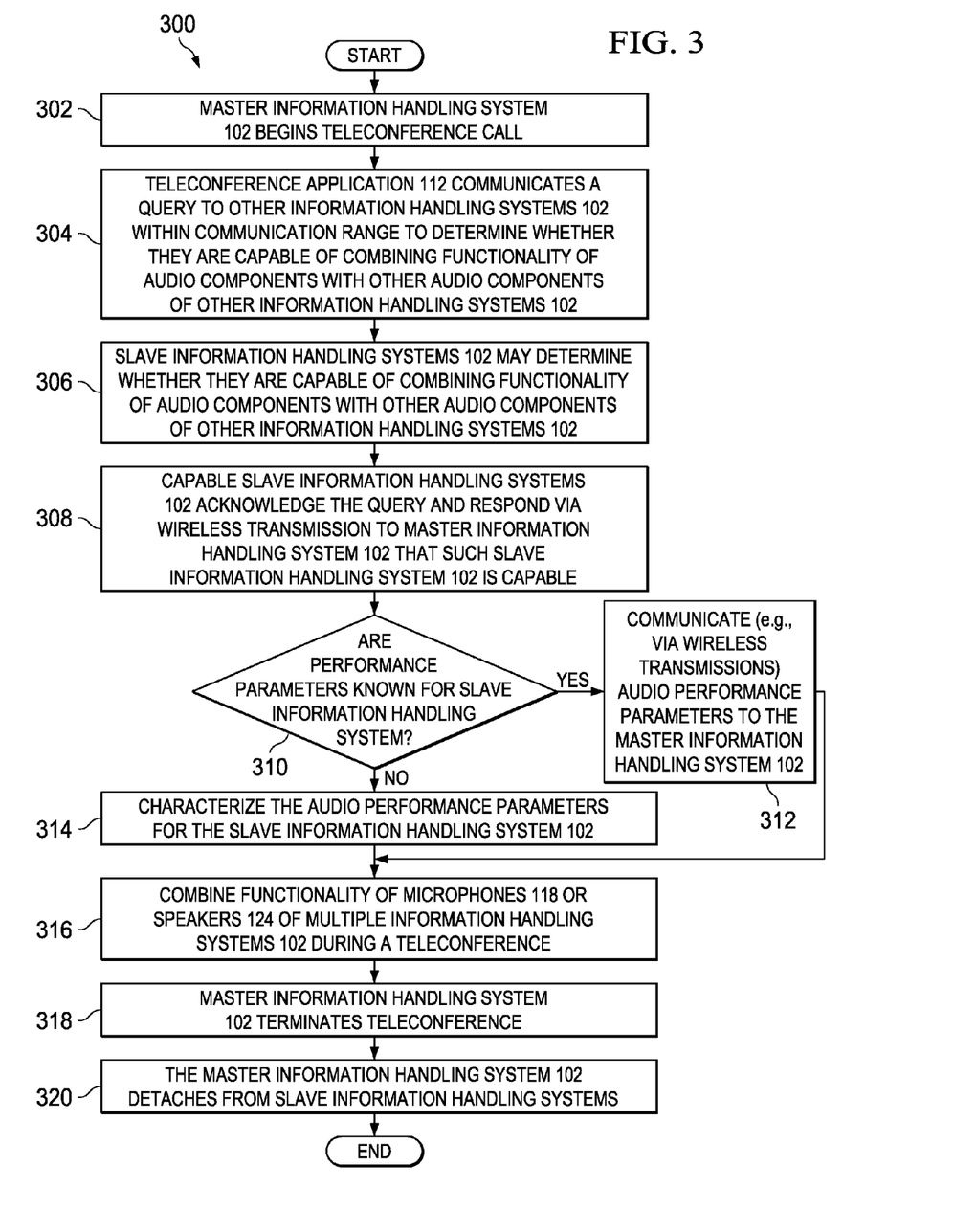
FIG. 3 illustrates a flow chart of an example method for combining functionality of audio components of multiple information handling systems, in accordance with embodiments of the present disclosure.

Preferred embodiments and their advantages are best understood by reference to FIGS. 1-3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

An information handling system may include or may be coupled via a network to one or more arrays of storage resources. The array of storage resources may include a plurality of storage resources, and may be operable to perform one or more input and/or output storage operations, and/or may be structured to provide redundancy. In operation, one or more storage resources disposed in an array of storage resources may appear to an operating system as a single logical storage unit or "logical unit."

In certain embodiments, an array of storage resources may be implemented as a Redundant Array of Independent Disks (also referred to as a Redundant Array of Inexpensive Disks or a RAID). RAID implementations may employ a number of techniques to provide for redundancy, including striping, mirroring, and/or parity checking. As known in the art, RAIDs may be implemented according to numerous RAID standards, including without limitation, RAID 0, RAID 1, RAID 0+1, RAID 3, RAID 4, RAID 5, RAID 6, RAID 01, RAID 03, RAID 10, RAID 30, RAID 50, RAID 51, RAID 53, RAID 60, RAID 100, etc.

For the purposes of this disclosure, the terms "wireless transmissions" and "wireless communication" may be used to refer to all types of electromagnetic communications which do not require a wire, cable, or other types of conduits. Examples of wireless transmissions which may be used include, but are not limited to, short-range wireless communication technologies (e.g., proximity card, Radio-Frequency Identification (RFID), Near Field Communication (NFC), BLUETOOTH, ISO 14443, ISO 15693, or other suitable standard), personal area networks (PAN) (e.g., BLUETOOTH), local area networks (LAN), wide area networks (WAN), narrowband personal communications services (PCS), broadband PCS, circuit switched cellular, cellular digital packet data (CDPD), radio frequencies, such as the 800 MHz, 900 MHz, 1.9 GHz and 2.4 GHz bands, infra-red and laser.

FIG. 1 illustrates a block diagram of an example teleconferencing system 100, in accordance with embodiments of the present disclosure. As depicted in FIG. 1, teleconferencing system 100 may include one or more information handling systems 102 and a network 108.

Each information handling system 102 may generally be configured to communicate via network 108 with one or more other information handling systems 102. In certain embodiments, one or more of information handling systems 102 may be a personal computer (e.g., a desktop computer or a portable computer). In these and other embodiments, one or more of information handling systems 102 may be a mobile device (e.g., smart phone, a tablet computing device, a handheld computing device, a personal digital assistant, or any other device that may be readily transported on a person of a user of such mobile device). In these and other embodiments, one or more of information handling systems 102 may be a Voice over Internet Protocol (VoIP) phone (e.g., a purpose-built hardware device that appears much like an ordinary landline telephone).

As depicted in FIG. 1, each information handling system 102 may include a processor 103, a memory 104 communicatively coupled to processor 103, a network interface 106 communicatively coupled to processor 103, a storage resource 110 communicatively coupled to processor 103, and a user interface 114 communicatively coupled to processor 103.

Each processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in its associated memory 104, associated storage resource 110, and/or another component of information handling system 102.

Each memory 104 may be communicatively coupled to its associated processor 103 and may include any system, device, or apparatus configured to retain program instructions and/or data for a period of time (e.g., computer-readable media). Each memory 104 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to its associated information handling system 102 is turned off.

Each network interface 106 may include any suitable system, apparatus, or device operable to serve as an interface between its associated information handling system 102 and network 108. Each network interface 106 may enable its associated information handling system 102 to communicate over network 108 using any suitable transmission protocol and/or standard, including without limitation all transmission protocols and/or standards enumerated below with respect to the discussion of network 108. A network interface 106 may be configured to communicate to other network interfaces 106 via wireless transmissions and/or wired communications.

Each storage resource 110 may include a system, device, or apparatus configured to store data. A storage resource 110 may include one or more hard disk drives, magnetic tape libraries, optical disk drives, magneto-optical disk drives, solid state storage drives, compact disk drives, compact disk arrays, disk array controllers, and/or any other systems, apparatuses or devices configured to store data. In certain embodiments, storage resource 110 may include one or more storage enclosures configured to hold and/or power one or more of such devices. In the embodiments represented by FIG. 1, storage resource 110 may reside within its associated information handling system 102. However, in other embodiments, storage resource 110 may reside external to its associated information handling system 102 (e.g., may be coupled to its associated information handling system 102 via network 108).

As shown in FIG. 1, a storage resource 110 may have stored thereon a teleconferencing application 112. Teleconferencing application 112 may comprise a program of instructions which a processor 103 may read and execute to manage participation of a participant 122 in a teleconference with one or more other participants 122, as described in greater detail elsewhere in this disclosure. Although teleconferencing application 112 is depicted in FIG. 1 as being locally stored to a storage resource 110 of an information handling system 102, in some embodiments, teleconferencing application 112 may be stored externally or remotely from an information handling system 102 and accessible to such information handling system 102 via network 108, and loaded by processor 103 via network 108 (e.g., such teleconference application 112 may be a streaming application).

User interface 114 may comprise any instrumentality or aggregation of instrumentalities by which a participant 122 may interact with information handling system 102. For example, user interface 114 may permit a user to input data and/or instructions into information handling system 102 (e.g., via a keypad, keyboard, touch screen, microphone, camera, and/or other data input device), and/or otherwise manipulate information handling system 102 and its associated components. User interface 114 may also permit information handling system 102 to communicate data to a participant 122 (e.g., via a display device, speaker, and/or other data output device). As shown in FIG. 1, user interface 114 may include one or more of a display 116, microphone 118, camera 120, and speaker 124.

A display 116 may comprise any suitable system, device, or apparatus configured to display human-perceptible graphical data and/or alphanumeric data to a participant 122. For example, in some embodiments, display 116 may comprise a liquid crystal display.

A microphone 118 may comprise any system, device, or apparatus configured to convert sound incident at microphone 118 to an electrical signal that may be processed by processor 103. In some embodiments, microphone 118 may include a capacitive microphone (e.g., an electrostatic microphone, a condenser microphone, an electret microphone, a microelectromechanical systems (MEMS) microphone, etc.) wherein such sound is converted to an electrical signal using a diaphragm or membrane having an electrical capacitance that varies as based on sonic vibrations received at the diaphragm or membrane.

A camera 120 may comprise any system, device, or apparatus configured to record images (moving or still) into one or more electrical signals that may be processed by processor 103.

A speaker 124 may comprise any system, device, or apparatus configured to produce sound in response to electrical audio signal input. In some embodiments, a speaker 124 may comprise a dynamic loudspeaker, which employs a lightweight diaphragm mechanically coupled to a rigid frame via a flexible suspension that constrains a voice coil to move axially through a cylindrical magnetic gap such that when an electrical signal is applied to the voice coil, a magnetic field is created by the electric current in the voice coil, making it a variable electromagnet. The coil and the driver's magnetic system interact, generating a mechanical force that causes the coil (and thus, the attached cone) to move back and forth, thereby reproducing sound under the control of the applied electrical signal coming from the amplifier.

In addition to processor 103, memory 104, network interface 106, storage resource 110, and user interface 114, information handling system 102 may include one or more other information handling resources. Such an information handling resource may include any component system, device or apparatus of an information handling system, including without limitation, a processor, bus, memory, I/O device and/or interface, storage resource (e.g., hard disk drives), network interface, electro-mechanical device (e.g., fan), display, power supply, and/or any portion thereof. An information handling resource may comprise any suitable package or form factor, including without limitation an integrated circuit package or a printed circuit board having mounted thereon one or more integrated circuits.

Network 108 may be a network and/or fabric configured to couple information handling systems 102 to one another. Network 108 may include a communication infrastructure, which provides physical connections, and a management layer, which organizes the physical connections, and information handling systems 102. Network 108 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet, or any other appropriate architecture or system that facilitates the communication of signals, data, and/or messages (generally referred to as data). Network 108 may transmit data using any storage and/or communication protocol, including without limitation, Fibre Channel, Frame Relay, Asynchronous Transfer Mode (ATM), Internet protocol (IP), other packet-based protocol, small computer system interface (SCSI), advanced technology attachment (ATA), serial ATA (SATA), advanced technology attachment packet interface (ATAPI), serial storage architecture (SSA), integrated drive electronics (IDE), and/or any combination thereof. Network 108 and its various components may be implemented using hardware, firmware, software, or any combination thereof.

In a typical teleconference setting, participants 122 may physically be present in a plurality of locations. Each location may include one or more participants 122 and one or more information handling systems 102 configured to execute a corresponding teleconference application 112. For example, as shown in FIG. 2, at a particular location 202 (e.g., a conference room) participants 122 may be arranged at various positions of the location, with some participants 122 proximate to a corresponding information handling system 102 and some participants 122 not proximate to a corresponding information handling system 102. In addition, the capabilities of audio components (e.g., microphones 118 and speakers 124) of the various information handling systems 102 present in a location 202 may differ. As an example, microphones 118 and speakers 124 may vary in their abilities to capture or generate sound at various volume levels and frequencies. In addition, in a teleconference setting, a participant 122 who is actively speaking may be stationary or in motion. In typical teleconferencing approaches, generally only a single information handling system is used as an audio communications path and thus, in such traditional approaches, capturing sound from an actively-speaking participant 122 may be difficult.

To reduce or eliminate these and/or other disadvantages of traditional teleconferencing systems, teleconference applications 112 executing on information handling systems 102 may functionally combine or "fuse" microphones 118 and/or speakers 124 of enabled information handling systems 102 such that input audio streams to enabled microphones 118 may be combined and/or output audio streams to enabled speakers 124 may be combined. By leveraging acoustic elements of information handling systems 102 in a location 202, a more uniform audio experience (relative to the audio experience of traditional approaches) may be enabled.

FIG. 3 illustrates a flow chart of an example method 300 for combining functionality of audio components of multiple information handling systems, in accordance with embodiments of the present disclosure. According to some embodiments, method 300 may begin at step 302. As noted above, teachings of the present disclosure may be implemented in a variety of configurations of system 100. As such, the preferred initialization point for method 300 and the order of the steps comprising method 300 may depend on the implementation chosen.

At step 302, teleconference application 112 of a first information handling system 102, which may be referred to as a "master" information handling system, may begin a teleconference call. At step 304, teleconference application 112 may communicate a query to other information handling systems 102 within communication range (e.g., within the same conference room) to determine if any of the other information handling systems 102, which may be referred to as "slave" information handling systems, are capable of combining functionality of audio components (e.g., microphones 118, speakers 124) with other audio components of other information handling systems 102 within the communication range of the master information handling system 102. In some embodiments, such queries and responses thereto may be communicated via wireless transmissions (e.g., Wireless Fidelity, BLUETOOTH, etc.). In these and other embodiments, such queries and responses thereto may be communicated via wired transmissions (e.g., via a network hub within network 108). In embodiments wherein such queries and responses thereto may be communicated via wired transmissions, such queries may be limited to slave information handling systems 102 proximate to master information handling system 102, for example, by limiting such queries to slave information handling systems 102 having certain Internet Protocol (IP) addresses or slave information handling systems 102 having Global Positioning System coordinates proximate to those of master information handling system 102.

At step 306, each slave information handling system 102 may determine whether it is capable of combining functionality of audio components with other audio components of other information handling systems 102 within the communication range of the master information handling system 102. Capability may include any permission, authorization, actual ability, or support for combining functionality of audio components with other audio components of other information handling systems 102. For example, in some instances, for a slave information handling system 102 to be capable, it must be permitted and/or authorized to communicate via wireless or wired transmissions with the master information handling system 102. As another example, for a slave information handling system 102 to be capable, it must have minimum required hardware and/or software components.

At step 308, each capable slave information handling system 102 may (e.g., via teleconference application 112 executing on such slave information handling system 102) acknowledge the query and respond via wireless or wired transmission to master information handling system 102 that such slave information handling system 102 is capable.

At step 310, each capable slave information handling system 102 may (e.g., via teleconference application 112 executing on such slave information handling system 102) determine whether its audio performance parameters are known. Such audio performance parameters may include an enumeration of audio components of a slave information handling system, audio amplitudes (e.g., sound volumes) for which such audio components are capable of receiving and/or generating, audio frequencies for which such audio components are capable of receiving and/or generating, and/or any other suitable operating parameters of audio components. If such audio performance parameters are known, method 300 may proceed to step 312 for such slave information handling system 102. Otherwise, if such audio performance parameters are not known, method 300 may proceed to step 314 for such slave information handling system 102.

At step 312, in response to audio performance parameters for such slave information handling system 102 being known, such slave information handling system 102 may (e.g., via teleconference application 112 executing on such slave information handling system 102) communicate (e.g., via wireless or wired transmissions) its audio performance parameters to the master information handling system 102. After completion of step 312, method 300 may proceed to step 316.

At step 314, in response to audio performance parameters for such slave information handling system 102 not being known, a teleconference application 112 at the slave information handling system 102, the master information handling system 102, or another slave information handling system 102 may generate one or more test signals (e.g., white noise and/or pink noise test signals at various amplitudes) to characterize the audio performance parameters for the slave information handling system 102. For example, a first information handling system 102 may play a test signal through its speaker 124 that is recorded by a microphone 118 of a second information handling system in order to characterize the audio performance parameters of the speaker 124 or the microphone 118. If necessary, the slave information handling system 102 or another slave information handling system 102 may communicate such characterized audio performance parameters to the master information handling system 102.

At step 316, based on the audio performance parameters retrieved for itself and each slave information handling system 102, the master information handling system 102 may execute algorithms for combining functionality of microphones 118 or speakers 124 of multiple information handling systems 102 during a teleconference. For example, teleconference applications 112 executing on a master and slave information handling system(s) 102 may operate in tandem to output audio signals received at the master information handling system 102 to speakers 124 of the master information handling system 102 and the slave information handling system(s) 102. Likewise, teleconference applications 112 executing on a master and slave information handling system(s) 102 may operate in tandem to capture audio from their respective microphones 118 and combine the microphone data (and process such data in accordance with a suitable algorithm) to transmit audio data from the master information handling system to one or more remote participant information handling systems 102. In addition, teleconference applications 112 executing on a master and slave information handling system(s) 102 may operate in tandem to execute other algorithms for conditioning the audio data, such as an acoustic echo cancellation algorithm based on the interaction of signals output by speakers 124 and signals received by microphones 118.

To synchronize audio data from various sources (e.g., microphones 118 which may be unevenly spaced, the known technique of band limited interpolation and power spectrum spread (or any other suitable technique) may be used to synchronize audio data.

At step 318, the master information handling system 102 may terminate the teleconference. At step 320, the master information handling system 102 may detach the slave information handling systems. After completion of step 320, method 300 may end.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using one or more information handling systems 102, components thereof, and/or any other system operable to implement method 300. In certain embodiments, method 300 may be implemented partially or fully in software and/or firmware embodied in computer-readable media.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. A method, comprising:
   determining, by a processor, capability of each particular information handling system of a plurality of information handling systems to support combination of functionality of audio components of the particular information handling system;
   determining, by the processor, audio performance parameters of the audio components of the information handling systems of the plurality of information handling systems which are capable of supporting combination of functionality of audio components; and
   based on the audio performance parameters, combining, by the processor, functionality of audio components of the plurality of information handling systems which are capable of supporting combination of functionality of audio components.

2. The method of claim 1, wherein the audio components comprise speakers of the information handling systems which are capable of supporting combination of functionality of audio components.

3. The method of claim 1, wherein the audio components comprise microphones of the information handling systems which are capable of supporting combination of functionality of audio components.

4. The method of claim 1, wherein determining audio performance parameters comprises utilizing test audio signals for characterizing the audio performance parameters of one or more of information handling systems of the plurality of information handling systems which are capable of supporting combination of functionality of audio components.

5. The method of claim 1, wherein determining audio performance parameters comprises receiving, via at least one of wired transmissions and wireless transmissions, audio performance parameters from at least one of the information handling systems of the plurality of information handling systems which are capable of supporting combination of functionality of audio components.

6. The method of claim 1, wherein combining functionality of audio components of the plurality of information handling systems which are capable of supporting combination of functionality of audio components comprises synchronizing audio signals associated with the audio components.

7. The method of claim 6, wherein synchronizing audio signals associated with the audio components comprises applying band limited interpolation and power spectrum spread to the audio signals.

8. An information handling system, comprising:
a processor;
a non-transitory computer readable medium coupled to the processor and having stored thereon a teleconference application, the teleconference application configured to, when executed:
determine capability of each particular information handling system of a plurality of information handling systems including the information handling system to support combination of functionality of audio components of the particular information handling system;
determine audio performance parameters of the audio components of the information handling systems of the plurality of information handling systems which are capable of supporting combination of functionality of audio components; and
based on the audio performance parameters, combine functionality of audio components of the plurality of information handling systems which are capable of supporting combination of functionality of audio components.

9. The information handling system of claim 8, wherein the audio components comprise speakers of the information handling systems which are capable of supporting combination of functionality of audio components.

10. The information handling system of claim 8, wherein the audio components comprise microphones of the information handling systems which are capable of supporting combination of functionality of audio components.

11. The information handling system of claim 8, the teleconference application further configured to determine audio performance parameters by utilizing test audio signals for characterizing the audio performance parameters of one or more of information handling systems of the plurality of information handling systems which are capable of supporting combination of functionality of audio components.

12. The information handling system of claim 8, the teleconference application further configured to determine audio performance parameters by receiving, via at least one of wired transmissions and wireless transmissions, audio performance parameters from at least one of the information handling systems of the plurality of information handling systems which are capable of supporting combination of functionality of audio components.

13. The information handling system of claim 8, the teleconference application further configured to combine functionality of audio components of the plurality of information handling systems which are capable of supporting combination of functionality of audio components by synchronizing audio signals associated with the audio components.

14. The information handling system of claim 13, the teleconference application further configured to synchronize audio signals associated with the audio components by applying band limited interpolation and power spectrum spread to the audio signals.

15. An article of manufacture comprising:
a non-transitory computer readable medium; and
computer-executable instructions carried on the non-transitory computer readable medium, the instructions readable by a processor, the instructions, when read and executed, for causing the processor to:
determine capability of each particular information handling system of a plurality of information handling systems including the information handling system to support combination of functionality of audio components of the particular information handling system;
determine audio performance parameters of the audio components of the information handling systems of the plurality of information handling systems which are capable of supporting combination of functionality of audio components; and
based on the audio performance parameters, combine functionality of audio components of the plurality of information handling systems which are capable of supporting combination of functionality of audio components.

16. The article of claim 15, wherein the audio components comprise speakers of the information handling systems which are capable of supporting combination of functionality of audio components.

17. The article of claim 15, wherein the audio components comprise microphones of the information handling systems which are capable of supporting combination of functionality of audio components.

18. The article of claim 15, the instructions for causing the processor to determine audio performance parameters by utilizing test audio signals for characterizing the audio performance parameters of one or more of information handling systems of the plurality of information handling systems which are capable of supporting combination of functionality of audio components.

19. The article of claim 15, the instructions for causing the processor to determine audio performance parameters by receiving, via at least one of wired transmissions and wireless transmissions, audio performance parameters from at least one of the information handling systems of the plurality of information handling systems which are capable of supporting combination of functionality of audio components.

20. The article of claim 15, the instructions for causing the processor to combine functionality of audio components of the plurality of information handling systems which are capable of supporting combination of functionality of audio components by synchronizing audio signals associated with the audio components.

21. The article of claim 20, the instructions for causing the processor to synchronize audio signals associated with the audio components by applying band limited interpolation and power spectrum spread to the audio signals.

* * * * *